Sept. 27, 1932. D. E. SMOOT 1,879,915
PORTABLE ANIMAL BATH
Filed June 10, 1929 2 Sheets-Sheet 1
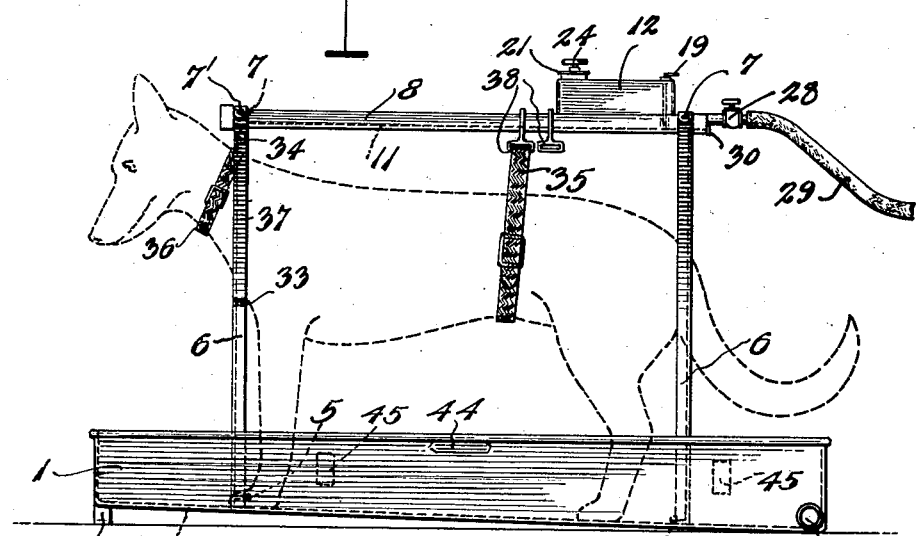
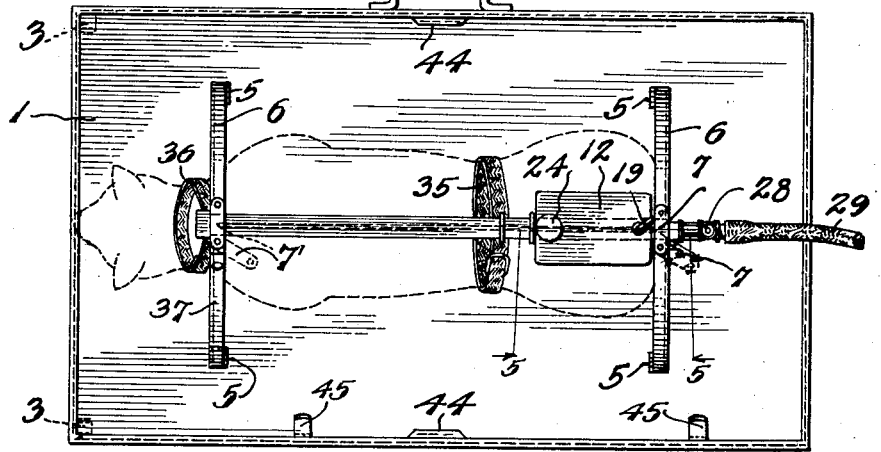
INVENTOR
D. E. Smoot
BY
Robb & Robb
ATTORNEYS Sept. 27, 1932.      D. E. SMOOT      1,879,915
PORTABLE ANIMAL BATH
Filed June 10, 1929       2 Sheets-Sheet 2
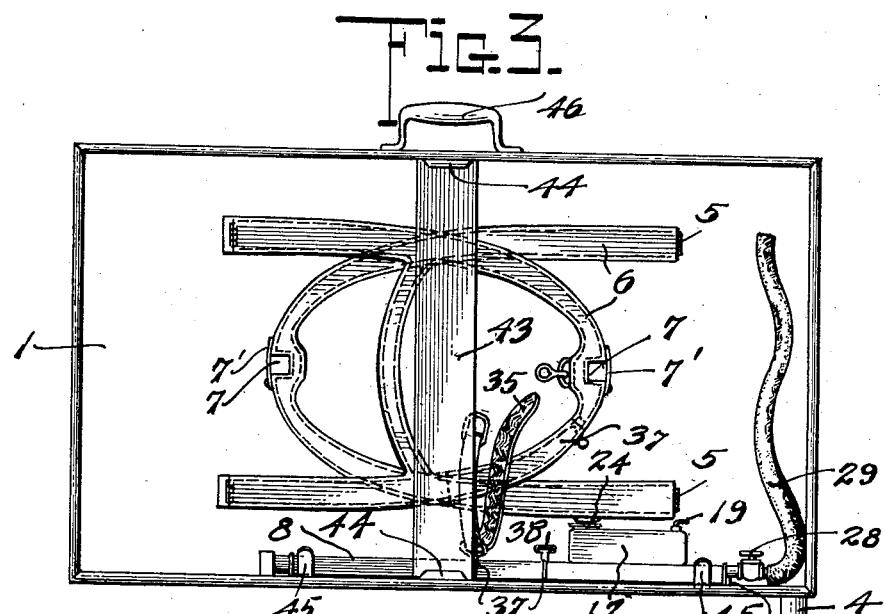
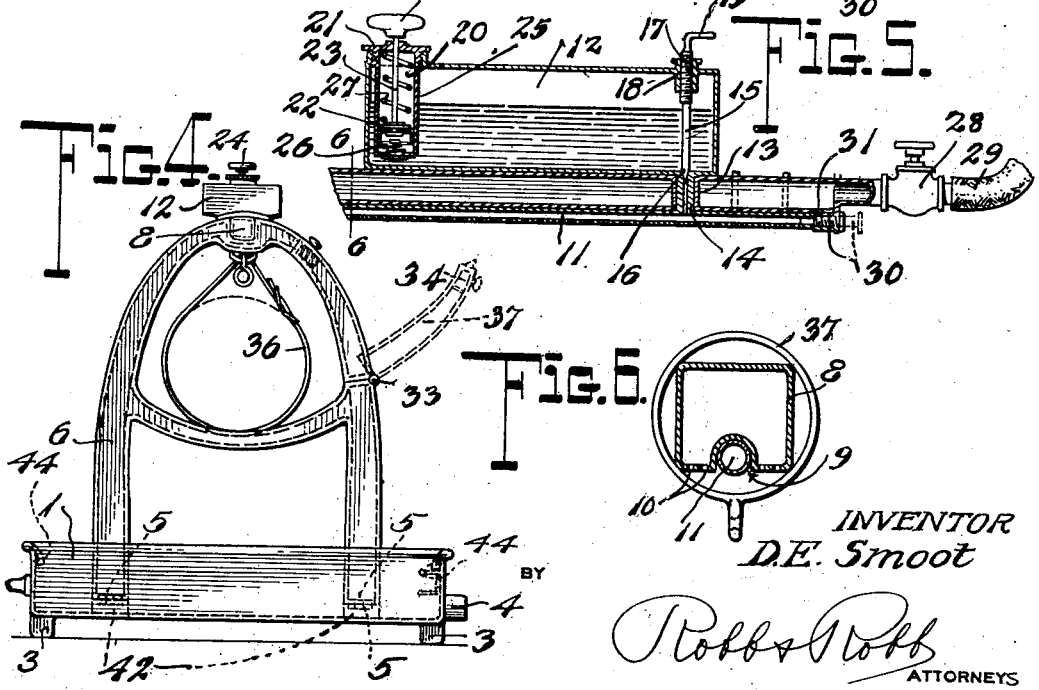
INVENTOR
D. E. Smoot
BY
Robb & Robb
ATTORNEYS Patented Sept. 27, 1932

1,879,915

UNITED STATES PATENT OFFICE

DAISY ELLEN SMOOT, OF APOPKA, FLORIDA, ASSIGNOR OF ONE-FOURTH TO JANIE IRENE CARROLL, OF ORLANDO, FLORIDA

PORTABLE ANIMAL BATH

Application filed June 10, 1929. Serial No. 369,883.

This invention relates to improvements in animal baths and more particularly to a portable bath construction whereby the same may be readily carried from place to place and quickly and easily made ready for use.

Some convenient means for periodically cleansing the family pet, such as a dog, cat, or other animal, and one which may be easily carried is highly desirable, and in numerous instances absolutely necessary, especially on camping or touring trips. Hotels and other lodging places usually forbid the use of the regular toilet facilities for personal use for the cleansing of pets, on sanitary principles as well as because of the probable damage to the furnishings which would result if it were permitted. The same objections apply to the private home in which some animal is kept as a pet.

The usual method of washing the animal in a stream or tub and then releasing it to dry is very ineffective because of the fact that the dog or other pet usually accumulates considerable dirt or dust before it has become thoroughly dry. Restraining the animal by a leash until dry is also impracticable because there is usually a sufficient freedom of movement allowed to enable the animal to brush against or lie down in dusty or dirty places.

It has been my aim to provide a portable, knocked-down animal bath which occupies a very small space when in knocked-down position (this compactness being very essential for touring and camping trips) and which may be quickly and readily assembled for use. Such compactness and facility of assembly is also highly desirable for an animal bath to be used in the home or apartment as well as for touring and camping trips, the apparatus being readily stored in an out-of-the-way place such as a cupboard or closet between periods of use.

A further object of the invention is to provide a means for securely holding the animal comparatively stationary in the bath to prevent splashing of the water on the operator by its struggles. The same device also affords a means for restraining the animal after the bath until thoroughly dry.

I have further provided a means for spraying the animal with liquid soap, medicant or other detergent, after being positioned in the tub and secured, and additional means for spraying and rinsing the animal.

Other and further objects and advantages of the invention will be hereinafter set forth and the novel features thereof defined by the appended claims.

In the drawings:

Fig. 1 is a side elevation of my animal bath, the parts being in assembled position and the animal secured in position for the cleansing operation;

Fig. 2 is a top plan view of the device shown in Fig. 1;

Fig. 3 is a plan view of my device in collapsed or knocked-down position;

Fig. 4 is an end view of the device shown in Fig. 1 before the animal has been positioned therein;

Fig. 5 is an enlarged fragmentary detail sectional view of the detergent receptacle and associated spray controlling parts;

Fig. 6 is a sectional view taken on line 6—6 of Fig. 5, the slidable rings for engaging the body straps being also shown; and Fig. 7 is a perspective view of my auxiliary platform which is to be used when cleansing a small animal.

Like numerals refer to like parts in the several figures of the drawings in which 1 denotes a shallow tub or receptacle preferably having an inclined bottom 2 which is formed with short legs or feet 3 at the shallow end and having a drain outlet 4 at the opposite end. Connected to the tub or receptacle in any suitable manner, such as by hinges 5, are the supports 6 which may be formed of wood, channel iron, or any other suitable material which is not subject to rust and which has a sufficient amount of rigidity to withstand the stresses incident to the struggles of a large animal.

Formed at the upper extremities of the supports 6 are notches or recesses 7 for receiving therein a main spray pipe 8, this spray pipe having any desired shape. A suitable retaining clip 7' pivoted at one end may be used to securely hold the spray pipe in the notches or recesses at the upper end of the support. I preferably employ a spray pipe of substantially rectangular cross section having a groove or recess 9 formed in the lower face extending longitudinally thereof, and small perforations 10 on each side of the said recess. Located in the recess 9 is a supplemental spray pipe 11 having perforations in the lower portion thereof, this spray pipe being in communication with a detergent container or receptacle 12 carried by the main spray pipe, by means of a passage-way 13, said passage-way being formed in any suitable manner, as, for example, by a sleeve 14 extending through an opening in the main spray pipe.

In Fig. 5 I have shown a needle valve 15 having a pointed end 16 cooperating with the upper end of the sleeve 14, the upper portion of the valve being threaded at 17 to engage a suitable threaded bushing 18 formed in the container. Manipulation of the valve handle 19 permits a control of the detergent flow through the passage-way 13 and also allows the flow of the detergent to be completely shut off by screwing the needle valve closed.

Suitable means for producing a pressure within the receptacle 12 may be used for forcing the detergent into the spray pipe 11 to effect spraying action. I have shown at 20 a pump mechanism formed as a unit with the filling opening closure 21 which is adapted to be screwed into the said filling opening. A plunger 22 having a connecting rod 23 fastened thereto which extends through the closure member 21 and terminates in a knob or handle 24, cooperates with a cylinder 25 to force air into the receptacle when the plunger is reciprocated. A suitable check valve 26 is located at the bottom of the cylinder 25 to prevent the air from leaking back into the cylinder 25 and forcing the plunger upwardly. To further insure the retaining of the plunger in a downward position, I also employ a spring 27, one end of which rests on the upper side of the plunger and the other end bears against the under side of the closure 21, thereby causing the connecting rod 23 and knob 24 to be held in an out-of-the-way position when not in use.

A valve fitting 28 is shown connected at one end of the main spray pipe 8 to afford a control of the spray and a means for completely shutting off the flow of the water when desired. The valve may be connected to the water supply in any suitable manner, such as, for example, by a hose 29.

In Fig. 5 I have shown an adjustable plug 30 which is preferably threaded into the end of the detergent spray pipe and which may be unscrewed or backed out to uncover a port or opening 31 which establishes communication between the main spray pipe 8 and the detergent spray pipe 11 for flushing the latter. I have thus provided a means for minimizing the possibility of the perforations in the pipe 11 becoming clogged or stopped up. The plug 30 may be also used to effect a fuller and stronger rinsing spray by allowing the water to flow into the small pipe 11 as well as into the main pipe 8, thereby causing all of the perforations across the lower face of the spraying instrumentalities to be used. When the plug 30 is in position to establish communication between the two spray pipes, the needle valve 15 should be screwed down to closed position to prevent the water from backing up into the detergent receptacle 12 and diluting the detergent fluid.

In Fig. 4 I have shown a hinged section 32 pivoted at 33 and having a latch 34 for retaining the same in closed position. This hinged section facilitates the placing of a large animal, such as a police dog or the like, in position in the bath where it is to be retained by suitable straps 35 and a collar 36. The collar 36 may be connected to the support or spray pipe in any suitable manner and may be further provided with a means for quickly detaching the same. Rings 37 having slotted members 38 formed thereon for receiving the body straps, are shown carried by the main spray pipe 8 and may be slidable thereon to enable the straps to be placed around various sized animals. Suitable buckles or clasps may be used to adjust the straps to the size of the particular animal being cleansed.

In Fig. 7 is shown a platform 39 preferably formed of foraminous material and having suitable reinforcing members 40 to give the proper stiffness to support the weight of a small animal which is to be placed thereon. The legs 41 support the platform at the desired height.

In Fig. 3 the apparatus is shown in collapsed position, the supports 6 being folded upon each other by means of the hinged connections 5, one of the supports being preferably hinged to blocks 42 to enable the supports to be folded in a flat position upon each other. A retaining strip or member 43 preferably formed of flexible material is adapted to engage the projections 44 formed on the sides of the receptacle or tub 1 to hold the supports in folded position. If it is desired, resilient clamping members 45 may be fixed to the side of the tub to engage the spray pipe 8 and associated parts when the device is in collapsed position, thus preventing the pipe from jostling and rattling around in the tub when it is being carried. A suitable handle 46 is formed on one side of the tub for carrying the same when the parts are in folded or collapsed position.

The operation of my device is as follows: Assuming the device to be in collapsed position as shown in Fig. 3, the retaining strip 43 is disengaged from the projections 44 whereupon the supports 6 may be swung on the hinges 5 to a vertical position and the spray pipe 8 placed in the recesses 7 and firmly held therein by the clips 7'. The hinged section 32 formed in one of the supports is then unlatched and swung open to allow the animal to be placed in the tub beneath the spray pipe where it is secured in position by the collar 36 and one or more body strips 35, after which the cleansing operation may be performed.

The plunger 22 is then manipulated by the knob 24 to produce a pressure on the detergent in the container 12. After opening the valve 28 to give the animal a preliminary wetting, the valve 28 is closed and the needle 15 is opened the desired amount to cause the liquid soap or other detergent in the container 12 to be discharged through the small spray pipe 11 on the animal. When a sufficient amount of the detergent has been sprayed on, the valve is then closed and the animal is washed and scrubbed thoroughly with a brush or in any other suitable manner, after which the valve 28 is again opened to rinse off the soap, and if desired the plug 30 may be unscrewed to allow the water to flow in the small spray pipe 11 as well as in the large spray pipe, thereby giving a stronger and fuller spray. A disinfectant or flea poison may also be placed in the container shown in Fig. 5 and sprayed on the animal and thoroughly rubbed in with a brush to insure sufficient penetration of the animal's coat to kill all of the fleas.

After the rinsing operation the water is discharged through the drain 4 which may be connected with a hose or other suitable discharge conduit. When the animal has been removed from the bath, the spray pipe 11 may be flushed out to prevent the perforations from becoming clogged with soap or other material. The parts may be then disconnected and the supports folded to a collapsed position as shown in Fig. 3.

While the specific details of construction have been herein shown and described, the invention is not confined thereto as changes and alterations may be made without departing from the spirit thereof as defined by the appended claims.

Having thus described my invention, what I claim as new and desire to secure by Letters Patent is:

1. In an animal bath, an elongated receptacle, a spray pipe located above said receptacle and extending longitudinally of the same, a pair of collapsible supports for said spray pipe connected to said receptacle, means for detachably securing said spray pipe to said supports, and means for retaining the said supports and spray pipe in collapsed position.

2. In an animal bath, a receptacle, a main spray pipe located above said receptacle and having a recess formed in the under face thereof, a supplemental spray pipe located in said recess, supports for said spray pipes, and means for detachably securing said spray pipes to said supports.

3. In an animal bath, a receptacle, a main spray pipe located above said receptacle, a supplemental spray pipe, a supply for said main spray pipe, a container adapted to receive a detergent, said container being in communication solely with said supplemental spray pipe, means separate from said supply for producing pressure in said container, and means for controlling the flow of the detergent from the said container.

4. In an animal bath, a receptacle, a main spray pipe, a supplemental spray pipe carried by said main spray pipe, a support at each end of said receptacle hinged to the bottom thereof, said supports having a bifurcation at their upper ends for removably receiving the main spray pipe, a detergent container for said supplemental spray pipe, and means for controlling the flow of said detergent.

5. In an animal bath, a receptacle, a main spray pipe, a supplemental spray pipe carried by said main pipe, foldable supports for said spray pipes, a detergent container for said supplemental spray pipe, a pump for producing pressure within said container, and valve means for controlling the flow of the detergent.

6. In an animal bath, a receptacle, a main spray pipe, a detergent spray pipe, supports for said spray pipes, and means for establishing communication between the main spray pipe and the detergent spray pipe for diverting a portion of the fluid from the main spray pipe into the detergent spray pipe and flushing the latter.

In testimony whereof I affix my signature.

DAISY ELLEN SMOOT.